(12) United States Patent
Eckert et al.

(10) Patent No.: US 6,804,598 B2
(45) Date of Patent: Oct. 12, 2004

(54) SYSTEM AND METHOD FOR CONTROLLING BRAKE ACTUATION ENERGY IN ELECTRONICALLY-CONTROLLED VEHICLE BRAKE SYSTEMS

(75) Inventors: Horst Eckert, Rehburg-Loccum (DE); Arnd Gaulke, Ronnenberg (DE)

(73) Assignee: WABCO GmbH & Co oHG, Hannover (DE)

( * ) Notice: Subject to any disclaimer, the term of this patent is extended or adjusted under 35 U.S.C. 154(b) by 8 days.

(21) Appl. No.: 10/426,965

(22) Filed: Apr. 29, 2003

(65) Prior Publication Data

US 2003/0216849 A1 Nov. 20, 2003

(30) Foreign Application Priority Data

Apr. 29, 2002 (DE) .......................................... 102 19 067

(51) Int. Cl.$^7$ ............................................. G06F 17/00
(52) U.S. Cl. .............................. 701/71; 701/90; 701/70; 303/7; 303/128
(58) Field of Search ............................. 701/71, 90, 70, 701/80, 78, 83, 84, 91, 96; 303/7, 128, 121, 163, 165

(56) References Cited

U.S. PATENT DOCUMENTS

| | | | |
|---|---|---|---|
| 4,674,326 A | | 6/1987 | Reinecke |
| 4,685,745 A | | 8/1987 | Reinecke |
| 4,790,606 A | | 12/1988 | Reinecke |
| 6,505,110 B1 | * | 1/2003 | Yoshino ...................... 701/71 |
| 2002/0087248 A1 | * | 7/2002 | O'Dea et al. .................. 701/71 |

FOREIGN PATENT DOCUMENTS

| | | |
|---|---|---|
| DE | 40 07 360 A1 | 9/1991 |
| DE | 40 20 693 A1 | 2/1992 |
| DE | 42 08 581 A1 | 5/1993 |
| DE | 41 42 670 A1 | 6/1993 |
| DE | 42 24 971 A1 | 2/1994 |
| DE | 44 18 768 A | 12/1995 |
| DE | 195 28 553 A1 | 2/1996 |
| DE | 197 13 561 C1 | 5/1998 |
| DE | 197 07 207 A1 | 8/1998 |
| DE | 197 26 116 A1 | 1/1999 |
| DE | 199 33 961 A1 | 9/2000 |
| DE | 100 12 448 A1 | 10/2001 |
| DE | 101 06 374 A1 | 9/2002 |
| EP | 0 188 685 B1 | 7/1986 |
| EP | 0 189 082 A2 | 7/1986 |
| EP | 0 247 253 A | 12/1987 |
| EP | 0 288 846 A2 | 11/1988 |
| EP | 0 320 602 B1 | 6/1989 |
| EP | 0 417 431 B1 | 3/1991 |
| EP | 0 421 066 A | 4/1991 |
| EP | 0 569 697 B1 | 11/1993 |
| EP | 0 569 698 B1 | 11/1993 |

* cited by examiner

Primary Examiner—Marthe Y. Marc-Coleman
(74) Attorney, Agent, or Firm—Kramer Levin Naftalis & Frankel LLP

(57) ABSTRACT

A system and method for controlling brake actuation energy in electronically controlled brake systems (EBSs) of vehicles having front and rear axles. To prevent undesired overheating of brakes during braking, the temperatures of the brakes of the wheels of the front and rear axles are determined and compared with one another and with a preset limit value. If the limit value is reached during braking, (i) less brake actuation energy is provided to the brakes with the higher temperatures, while more brake actuation energy is provided to the brakes with the lower temperatures, (ii) the differential slip threshold for the light braking brake lining wear control range of the EBS is raised and/or (iii) the driver's set brake signal for the transition from the light braking brake lining wear control range to the heavy braking adhesion control range of the EBS is raised.

15 Claims, 2 Drawing Sheets

SYSTEM AND METHOD FOR CONTROLLING BRAKE ACTUATION ENERGY IN ELECTRONICALLY-CONTROLLED VEHICLE BRAKE SYSTEMS

BACKGROUND OF THE INVENTION

The present invention is directed generally to a system and method for controlling brake actuation energy in an electronically controlled vehicle brake system ("EBS").

A conventional EBS is designed to control brake lining wear and the adhesion relationship (that is, the coefficient of friction) between the vehicle wheels and the road surface. This is accomplished conventionally by controlling brake lining wear in the light braking range and adhesion in the heavy braking range.

When a vehicle driver depresses the brake pedal, the output brake actuation energy, in an initial range up to a presettable driver's set brake signal, is calculated solely according to criteria for controlling brake lining wear. In this initial range, axle loads are not considered. If the driver's set brake signal is reached, the control system switches from the light braking (brake lining wear) control range to the heavy braking (adhesion) control range. In the heavy braking range, comfort and safety aspects outweigh brake lining wear considerations.

The control objective in the heavy braking adhesion control range is equal adhesion—to achieve equal slip during braking for all vehicle wheels with no differential slip between vehicle axles. Axle loads are taken into consideration for calculation and control of brake actuation energy as the kinetic energy to be converted in the brakes is no longer equal from one axle to another. If set differential slip thresholds are reached before the driver's set brake signal is reached, the switch from the light braking brake lining wear control range to the heavy braking adhesion control range is triggered.

When, for example, a bus full of passengers is traveling downhill, the bus driver typically has to brake frequently, with the result that brake temperatures increase relatively quickly. As the brakes becomes hotter, the coefficient of friction ($\mu$) of the friction pair of the brake (brake lining/brake disk or brake lining/brake drum) decreases, sometimes by as much as 100%. A decrease in the coefficient of friction of the friction pair translates into poorer braking power.

If the brakes of the vehicle's front and rear axles heat to different temperatures, as is usually the case, the reduction of braking power is greatest where the temperature is highest. Under such conditions, the differential slip deviates from normal. Such a differential slip is compensated for by the EBS—the control objective of which is a differential slip of zero.

In commercial motor vehicles, especially trucks or buses, the cooling conditions for rear axle brakes are typically poorer than those for front axle brakes. Moreover, rear axle loads are routinely about 50 to 100% greater than front axle loads. This means that the rear axle brakes become hotter than the front axle brakes—and this can occur even in the light braking brake lining wear control range.

Since the rear axle brakes are hotter than the front axle brakes, they generate less braking power at the same brake actuation energy. By virtue of the zero differential slip control objective of the EBS, more brake actuation energy is introduced into the rear axle brakes under EBS control. As a result, the rear axle brakes become even hotter, presenting a possible overheating situation and associated undesired reduction in braking power.

Accordingly, it is desired to provide an improved system and method for controlling brake actuation energy that compensate for the zero differential slip control objective of the EBS when appropriate to prevent overheating of vehicle wheel brakes during braking and undesired reduction in braking power.

SUMMARY OF THE INVENTION

Generally speaking, in accordance with the present invention, an improved system and method for effecting temperature dependent control of brake actuation energy in a vehicle EBS are provided that compensate for the zero differential slip control objective of the EBS when appropriate to prevent overheating of vehicle wheel brakes during braking and undesired reduction in braking power.

In addition to conventional light braking (brake lining wear) control and heavy braking (adhesion) control, wheel brake temperature control is provided in the system and method according to the present invention, such that, if wheel brake temperatures reach a preset limit value during braking, the distribution of brake actuation energy is shifted from wheel brakes having higher temperatures to wheel brakes having lower temperatures. This can be accomplished by introducing more brake actuation energy into the wheel brakes having lower temperatures and less brake actuation energy (i.e., than before the limit value was reached) into the wheel brakes having higher temperatures, which can have a neutral effect on total braking power or, if necessary, cause a reduction in total braking power. In such case, the differential slip is not corrected to zero; rather, a non-zero differential slip is permitted.

According to the present invention, the differential slip threshold for the light braking brake lining wear control range and/or the driver's set brake signal for switching to the heavy braking adhesion control range is/are raised. Higher wheel brake temperatures mean a later transition to the adhesion control range, with commensurate greater protection of heated wheel brakes. The transition to the adhesion control range need not occur at a presettable higher driver's set brake signal, but can occur at a sliding value determined by wheel brake temperature (i.e., transition value=f (wheel brake temperature)).

According to another embodiment of the present invention, a separate, additional energy distribution calculation using rear axle brake temperatures and front axle brake temperatures as variables, possibly together with wheel brake temperatures of further axles, can be made.

In a further embodiment of the present invention, a signal warning the vehicle driver of an overheating condition during braking and the possibility of undesired reduction in braking power can be generated, for example, by brake pedal feel or by a visual or audible indicator.

Accordingly, it is an object of the present invention to provide a system and method for controlling brake actuation energy in a vehicle EBS that overcome disadvantages associated with prior art systems and methods.

It is a further object of the present invention to provide an improved system and method for effecting temperature dependent control of brake actuation energy in a vehicle EBS that compensate for the zero differential slip control objective of the EBS when appropriate to prevent overheating of vehicle wheel brakes during braking and undesired reduction in braking power.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicted in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

The term "brake actuation energy" as used herein is to be understood as encompassing all physical variables that cause a vehicle wheel brake supplied therewith to generate braking power. Examples of brake actuation energy are electrical variables such as current and voltage, or mechanical variables such as pressure. In the case of pressure as the brake actuation energy, pressurized liquids or gases, such as compressed air, can be used as the energy carrier.

Figure 1:
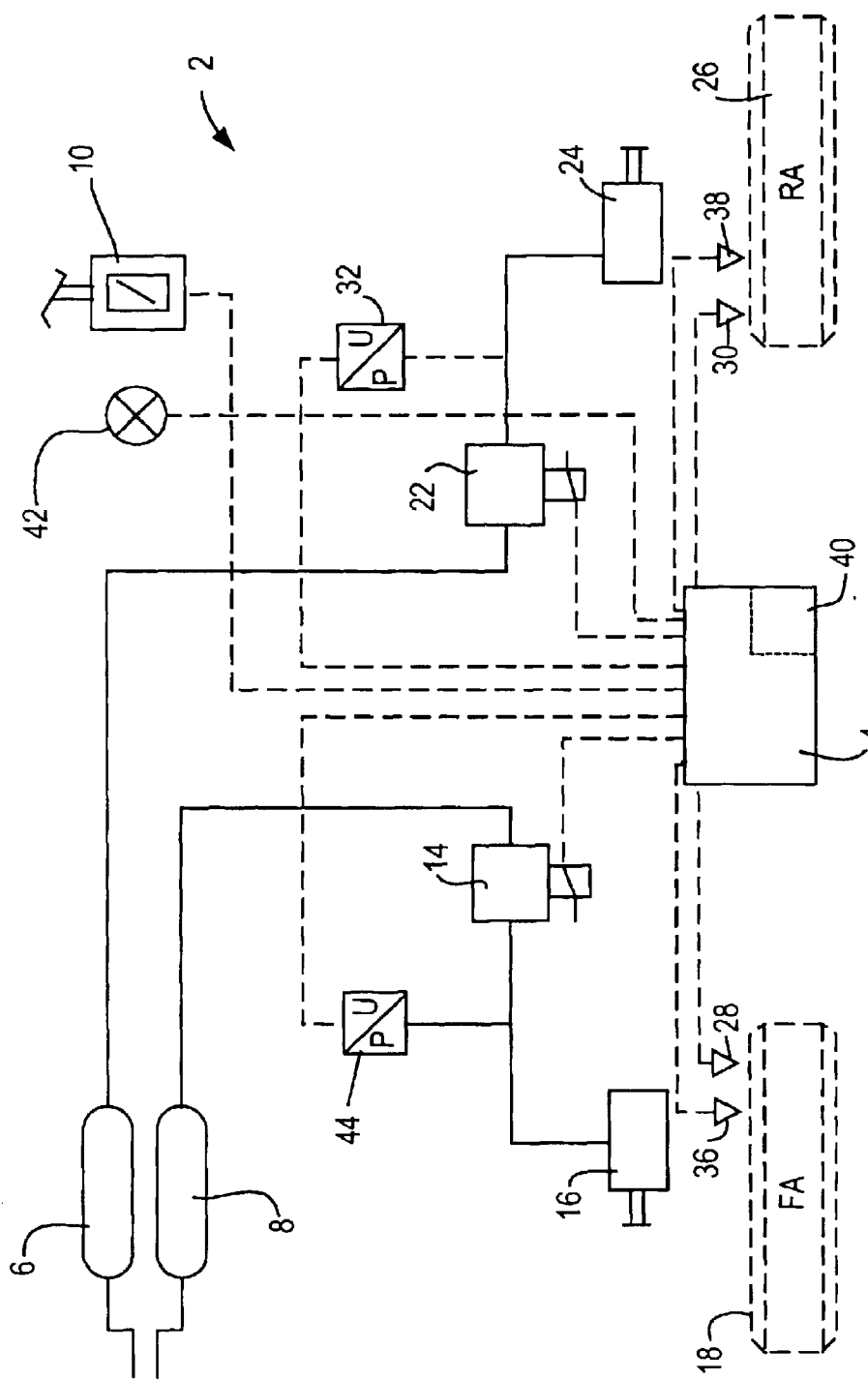
FIG. 1 is a schematic diagram depicting EBS control electronics provided in a vehicle constructed and arranged according to the system and method of the present invention to effect temperature dependent control of brake actuation energy.

Referring now to FIG. 1, in which energy conduits, such as, for example, pressure conduits, are depicted in solid lines and electrical conductors are depicted in broken lines, there is shown a schematic diagram of a vehicle equipped with an EBS 2 constructed and arranged in accordance with a preferred embodiment of the present invention. EBS 2 can be pneumatically operated, for example.

For both a front axle FA and a rear axle RA, only the vehicle wheels and associated components, such as, for example, pneumatic components, of one side of the vehicle are depicted in FIG. 1.

EBS 2 preferably includes a central control unit 4 for control of brake actuation energy. Central control unit 4 can also desirably include an integrated antilock brake system ("ABS").

Energy, such as, for example, compressed air, for actuation of the vehicle brakes is preferably stored in energy accumulators 6, 8 (e.g., compressed air reservoirs).

Preferably, a brake signal transmitter 10 is provided for use by the vehicle driver to transmit set values to EBS 2.

An energy allocator 14, such as, for example, a pressure modulator, is preferably electrically connected to a brake actuation device 16, such as, for example, a brake cylinder, for a wheel having a wheel brake 18 on front axle FA. A further energy allocator 22 (e.g., a pressure modulator) is preferably electrically connected to a brake actuation device 24 (e.g., a brake cylinder) for a vehicle wheel having wheel brake 26 on rear axle RA.

Wheel sensors 28, 30 are preferably used to monitor how the vehicle wheels are revolving. If the wheels exhibit a lockup tendency, control unit 4 or the ABS integrated in the control unit transmits, in known manner, electrical signals to energy allocators 14, 22 which reduce the brake actuation energy, such as, for example, brake pressure, and are thus able to eliminate lockup tendency.

Central control unit 4 preferably includes inputs for energy sensors 32, 44, such as, for example, pressure sensors, for determination of the brake actuation energy, such as, for example, brake pressure, in brake actuation devices 16, 24 (e.g., brake cylinders) of front and rear axles FA and RA. Central control unit 4 also desirably includes inputs for devices 36, 38, such as, for example, temperature sensors, for measuring the temperature of wheel brakes 18, 26, preferably continuously.

Central control unit 4 is preferably adapted to compare the determined temperatures of wheel brakes 18, 26 of the vehicle wheels of front axle FA and rear axle RA with one another and with a preset temperature limit value. If the determined temperatures equal or exceed the preset temperature limit value during vehicle braking, the energy distribution, such as, for example, pressure distribution, between the wheel brakes can be adjusted such that, by comparison with the status before the limit value was reached, less brake actuation energy (e.g., a lower brake pressure) is introduced into the wheel brakes with the higher temperatures, while more brake actuation energy (e.g., a higher brake pressure) is introduced into the wheel brakes with the lower temperatures. For example, if the temperatures of the rear axle (RA) brakes reach the limit value and are higher than the temperatures of the front axle (FA) brakes, the rear axle brakes will be loaded more lightly than before the temperature limit value was reached in order to reduce the temperature difference between the axles. For this purpose, a suitable additional electronic device 40 in central control unit 4 and/or a corresponding program expansion in the computer processor contained in the central control unit can be provided. The corresponding distribution of brake actuation energy between the wheel brakes, wherein, for example, lower pressure is introduced into the brake cylinders of the hotter brakes, is preferably brought about via energy allocators 14, 22 of EBS 2, but can also be achieved via separate energy allocators (not shown in FIG. 1).

It should be appreciated that the foregoing temperature dependent control can be implemented in tandem with conventional light braking (brake lining wear) control and heavy braking (adhesion) control.

The programming of EBS 2 can be expanded by raising the differential slip threshold as a function of wheel brake temperature to a value within the light braking brake lining wear control range, and also by raising the driver's set limit value for the switch to the heavy braking adhesion control range as a function of wheel brake temperature. With increasing temperature, the transition from the brake lining wear control range to the adhesion control range is increasingly delayed, and relatively greater protection of, for example, a hotter rear axle wheel brake is achieved.

The transition to the adhesion control range can also be governed according to a mathematical relationship wherein transition value=f (wheel brake temperature). That is, such transition occurs as a function of temperature, and not at a particular raised limit value.

An additional energy distribution calculation using rear axle brake temperatures and front axle brake temperatures as variables, possibly together with wheel brake temperatures of further axles, can also be made.

It should be understood that other control processes that raise wheel brake temperatures, such as vehicle traction control processes, can also be taken into consideration.

In addition, there is preferably provided, parallel to the temperature dependent brake control, a capability for warning the vehicle driver of an overheating condition during braking and the possibility of undesired reduction in braking power. The warning can be communicated to the vehicle driver via brake pedal feel and/or via an indicator 42 (visual and/or audible).

Brake temperature can be ascertained directly or indirectly in various ways via temperature models. For example, brake temperature can be measured by means of temperature sensors which can be disposed in the immediate vicinity of one of the brake elements, such as the brake disk. Also, brake temperature can be ascertained via a brake load signal which is representative of the load condition of the brakes and which links the vehicle speed with the pressing force of the brake disks in such a way that the resulting increase in brake disk temperature is determined and a preset temperature input value is appropriately raised. Additionally, brake temperature can be determined (i) by calculating the heat energy supply to the brakes from the decrease of kinetic energy of the vehicle during vehicle braking, (ii) from the deformation of brake components, (iii) from the instantaneous vehicle deceleration and the vehicle speed, and (iv) by estimation based on selection of a component the temperature of which can be determined in such a way that it reflects the thermal load condition of the brakes.

Figure 2:
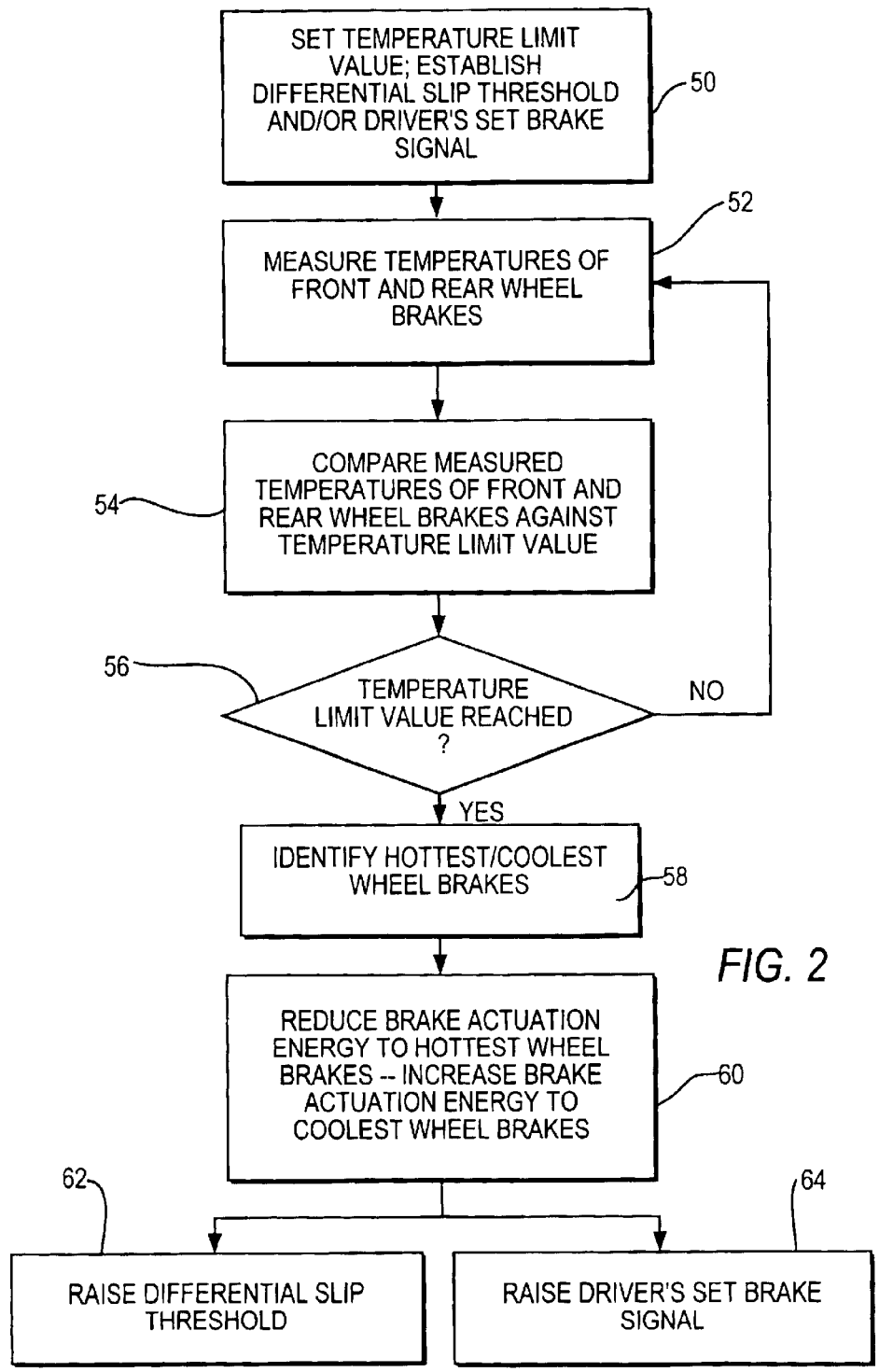
FIG. 2 is a flow chart depicting process steps for effecting control of brake actuation energy as a function of wheel brake temperature in a vehicle equipped with an EBS according to a preferred embodiment of the method of the present invention.

Referring now to FIG. 2, there is shown the process for effecting temperature dependent control of brake actuation energy in EBS 2, in addition to conventional light braking (brake lining wear) control and heavy braking (adhesion) control, according to a preferred method of the present invention. According to the preferred method, a temperature limit value is set for the front and rear wheel brakes, and a differential slip threshold for the light braking brake lining wear control range of the EBS and a driver's set brake signal for the transition from the light braking brake lining wear control range to the heavy braking adhesion control range of the EBS are established (step 50). The temperatures of the front and rear wheel brakes are determined (step 52) and compared against the temperature limit value (step 54). If brake temperatures reach the temperature limit value during vehicle braking (decision 56), the temperatures of the front and rear wheel brakes are compared to determine which wheel brakes are hotter and which are cooler (step 58). Brake actuation energy into the hotter ones of the front and rear wheel brakes is reduced; and brake actuation energy into the cooler ones of the front and rear wheel brakes is increased (step 60).

It should be understood that the next steps can be executed in combination or not; if executed in combination they can be effected in either order; or they can be effected simultaneously with each other or with process steps 58 or 60. For the sake of this embodiment, the differential slip threshold for the light braking brake lining wear control range of the EBS is raised if the temperature limit value is reached (step 62), and the driver's set brake signal for the transition from the light braking brake lining wear control range to the heavy braking adhesion control range of the EBS is also raised if the temperature limit value is reached (step 64).

Additionally, it is desirable to communicate a warning signal to the vehicle driver if the determined wheel brakes reach the temperature limit value during vehicle braking.

Accordingly, the present invention provides an improved system and method for effecting temperature dependent control of brake actuation energy in a vehicle EBS that compensates for the zero differential slip control objective of the EBS when appropriate to prevent overheating of vehicle wheel brakes during braking and undesired reduction in braking power. By virtue of the present invention, peak temperatures occurring on individual axles during vehicle braking are lowered (which is important, for example, in the case of vehicles transporting hazardous materials), and wheel brakes are protected against undesired thermal damage and brake lining wear.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling brake actuation energy in an electronically controlled brake system of a vehicle having a front axle including front wheels and front wheel brakes and a rear axle including rear wheels and rear wheel brakes, the method comprising the steps of setting a temperature limit value for said front and rear wheel brakes in said electronically controlled brake system, ascertaining temperatures of said front and rear wheel brakes, comparing said temperatures of said wheel brakes against said temperature limit value, if at least one of said temperatures of said wheel brakes reaches said temperature limit value during vehicle braking, comparing said temperatures of said wheel brakes to determine which ones of said front wheel brakes and rear wheel brakes have higher temperatures and which have lower temperatures, reducing brake actuation energy into said higher temperature ones of said front and rear wheel brakes, increasing brake actuation energy into said lower temperature ones of said front and rear wheel brakes, and at least one of (i) establishing a differential slip threshold for a light braking brake lining wear control range of said electronically controlled brake system and raising said established differential slip threshold if said temperature limit value is reached and (ii) establishing a driver's set brake signal for a transition from said light braking brake lining wear control range to said heavy braking adhesion control range of said electronically controlled brake system and raising said established driver's set brake signal if said temperature limit value is reached.

2. The method according to claim 1, wherein said transition to said heavy braking adhesion control range is effected as a function of said temperatures of said wheel brakes.

3. The method according to claim 1, wherein said steps of reducing brake actuation energy into said higher temperature ones of said front and rear wheel brakes and increasing brake actuation energy into said lower temperature ones of said front and rear wheel brakes are effected by a brake actuation energy allocation device separate from said electronically controlled brake system.

4. The method according to claim 1, wherein said electronically controlled brake system includes a control unit having programmed capability to effect said steps of reducing brake actuation energy into said higher temperature ones of said front and rear wheel brakes and increasing brake actuation energy into said lower temperature ones of said front and rear wheel brakes.

5. The method according to claim 1, further comprising the step of communicating a warning signal to an operator of said vehicle if at least one of said temperatures of said wheel brakes reaches said temperature limit value during vehicle braking.

6. The method according to claim 5, wherein said warning signal is at least one of a change in brake pedal feel, a visual signal and an audible signal.

7. A system for controlling brake actuation energy in an electronically controlled brake system of a vehicle having a front axle including front wheels and front wheel brakes and a rear axle including rear wheels and rear wheel brakes, the system comprising means for setting a temperature limit value for said front and rear wheel brakes in said electronically controlled brake system, means for ascertaining temperatures of said front and rear wheel brakes, means for comparing said temperatures of said wheel brakes against said temperature limit value, means for comparing said temperatures of said wheel brakes to determine which ones of said front wheel brakes and rear wheel brakes have higher temperatures and which have lower temperatures if at least one of said temperatures reaches said temperature limit value during vehicle braking, means for reducing brake actuation energy into said higher temperature ones of said front and rear wheel brakes, means for increasing brake actuation energy into said lower temperature ones of said front and rear wheel brakes, and means for at least one of (i) establishing a differential slip threshold for a light braking brake lining wear control range of said electronically controlled brake system and raising said differential slip threshold if said temperature limit value is reached and (ii) establishing a driver's set brake signal for a transition from said light braking brake lining wear control range to said heavy braking adhesion control range of said electronically controlled brake system and raising said driver's set brake signal if said temperature limit value is reached.

8. The system according to claim 7, wherein said means for reducing brake actuation energy into said higher temperature ones of said front and rear wheel brakes and increasing brake actuation energy into said lower temperature ones of said front and rear wheel brakes includes a control unit of said electronically controlled brake system.

9. The system according to claim 7, wherein said means for reducing brake actuation energy into said higher temperature ones of said front and rear wheel brakes and increasing brake actuation energy into said lower temperature ones of said front and rear wheel brakes includes a brake actuation energy allocation device separate from said electronically controlled brake system.

10. The system according to claim 7, wherein said transition to said heavy braking adhesion control range is effected as a function of said temperatures of said wheel brakes.

11. The system according to claim 7, wherein said means for ascertaining temperatures of said front and rear wheel brakes includes at least one temperature sensor.

12. The system according to claim 7, wherein said means for ascertaining temperatures of said front and rear wheel brakes includes means for calculating said temperatures according to a temperature model which takes into consideration at least one of a brake load signal representative of the load condition of said wheel brakes, heat energy supply to said wheel brakes, deformation of component parts of said wheel brakes, and instantaneous vehicle deceleration and vehicle speed.

13. The system according to claim 7, further comprising means for communicating a warning signal to an operator of said vehicle if at least one of said temperatures of said wheel brakes reaches said temperature limit value during vehicle braking.

14. The system according to claim 13, wherein said warning signal is at least one of a change in brake pedal feel, a visual signal and an audible signal.

15. A brake actuation energy control system for a vehicle, the system comprising a vehicle having a front axle including front wheels and front wheel brakes and a rear axle including rear wheels and rear wheel brakes, means for setting a temperature limit value for said front and rear wheel brakes in said electronically controlled brake system, means for ascertaining temperatures of said front and rear wheel brakes, means for comparing said temperatures against said temperature limit value, means for comparing said temperatures to determine which ones of said front wheel brakes and rear wheel brakes have higher temperatures and which have lower temperatures if at least one of said temperatures reaches said temperature limit value during vehicle braking, means for reducing brake actuation energy into said higher temperature ones of said front and rear wheel brakes, means for increasing brake actuation energy into said lower temperature ones of said front and rear wheel brakes, and means for at least one of (i) establishing a differential slip threshold for a light braking brake lining wear control range of said electronically controlled brake system and raising said differential slip threshold if said temperature limit value is reached and (ii) establishing a driver's set brake signal for a transition from said light braking brake lining wear control range to said heavy braking adhesion control range of said electronically controlled brake system and raising said driver's set brake signal if said temperature limit value is reached.

* * * * *